(12) United States Patent
Bathiche et al.

(10) Patent No.: US 9,586,147 B2
(45) Date of Patent: Mar. 7, 2017

(54) COORDINATING DEVICE INTERACTION TO ENHANCE USER EXPERIENCE

(75) Inventors: Steven N Bathiche, Kirkland, WA (US); Shiraz J Cupala, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 455 days.

(21) Appl. No.: 12/821,972

(22) Filed: Jun. 23, 2010

(65) Prior Publication Data
US 2011/0319166 A1   Dec. 29, 2011

(51) Int. Cl.
| | |
|---|---|
| G06F 15/16 | (2006.01) |
| A63F 13/843 | (2014.01) |
| A63F 13/5255 | (2014.01) |
| G02B 27/01 | (2006.01) |
| G06F 3/041 | (2006.01) |

(Continued)

(52) U.S. Cl.
CPC ........ *A63F 13/843* (2014.09); *A63F 13/5255* (2014.09); *G02B 27/017* (2013.01); *G06F 3/041* (2013.01); *G06F 3/04883* (2013.01); *G07F 17/32* (2013.01); *H04L 67/12* (2013.01); *H04L 67/38* (2013.01); *A63F 13/80* (2014.09); *A63F 2300/1093* (2013.01); *A63F 2300/405* (2013.01); *A63F 2300/6676* (2013.01); *A63F 2300/69* (2013.01); *G02B 2027/014* (2013.01)

(58) Field of Classification Search
CPC .................................. G09G 5/363; G06T 1/20
USPC ........................................................ 345/502
See application file for complete search history.

(56) References Cited

U.S. PATENT DOCUMENTS

| | | | | |
|---|---|---|---|---|
| 4,751,507 A | * | 6/1988 | Hama et al. ................... | 715/784 |
| 5,187,776 A | * | 2/1993 | Yanker .......................... | 715/800 |

(Continued)

FOREIGN PATENT DOCUMENTS

| | | |
|---|---|---|
| CN | 1964766 | 5/2007 |
| CN | 101499108 | 8/2009 |
| EP | 0558006 | 9/1993 |

OTHER PUBLICATIONS

Toyama, et al., "Probabilistic Tracking in a Metric Space," Eighth International Conference on Computer Vision, Vancouver, Canada, vol. 2, Jul. 2001, 8 pages.

(Continued)

*Primary Examiner* — Jin Ge
(74) *Attorney, Agent, or Firm* — Micah Goldsmith; Judy Yee; Micky Minhas

(57) ABSTRACT

A method for coordinating interaction between one or more computing devices for users participating in an interactive activity is provided. A reference point is identified on a physical surface via a primary computing device. The primary computing device may include a mobile computing device. The physical surface is utilized to render an interactive activity for one or more users. The reference point is communicated to one or more secondary computing devices, via the primary computing device. An interaction between the primary computing device and the secondary computing devices is coordinated utilizing the reference point. A user perspective image of the interactive game relative to the reference point is rendered on the physical surface via the primary computing device and the secondary computing devices to the users.

20 Claims, 12 Drawing Sheets

(51) Int. Cl.
*G06F 3/0488* (2013.01)
*G07F 17/32* (2006.01)
*H04L 29/08* (2006.01)
*H04L 29/06* (2006.01)
*A63F 13/80* (2014.01)

(56) References Cited

U.S. PATENT DOCUMENTS

| | | | | |
|---|---|---|---|---|
| 5,638,523 A * | 6/1997 | Mullet et al. | ................. | 715/855 |
| 5,818,455 A * | 10/1998 | Stone et al. | ................. | 345/619 |
| 6,184,859 B1 * | 2/2001 | Kojima | ................. | 345/629 |
| 6,411,274 B2 * | 6/2002 | Watanabe et al. | ................. | 345/684 |
| 6,417,867 B1 * | 7/2002 | Hallberg | ................. | 345/660 |
| 6,590,583 B2 * | 7/2003 | Soohoo | ................. | 345/660 |
| 6,982,728 B1 * | 1/2006 | Nicolas et al. | ................. | 345/649 |
| 7,151,530 B2 * | 12/2006 | Roeber et al. | ................. | 345/168 |
| 7,242,407 B2 * | 7/2007 | Blais | ................. | 345/582 |
| 7,274,381 B2 * | 9/2007 | Mojaver et al. | ................. | 345/647 |
| 7,389,003 B2 * | 6/2008 | Yamada et al. | ................. | 382/298 |
| 7,555,725 B2 * | 6/2009 | Abramson et al. | ................. | 715/781 |
| 7,911,409 B1 * | 3/2011 | Chatterjee et al. | ................. | 345/3.1 |
| 8,031,206 B2 * | 10/2011 | Shoemaker | ................. | 345/619 |
| 8,057,294 B2 * | 11/2011 | Pacey et al. | ................. | 463/20 |
| 2003/0005302 A1 * | 1/2003 | Searle | ................. | 713/176 |
| 2003/0062675 A1 * | 4/2003 | Noro et al. | ................. | 273/237 |
| 2003/0156144 A1 * | 8/2003 | Morita | ................. | 345/848 |
| 2005/0272503 A1 | 12/2005 | Thoresson | | |
| 2007/0085981 A1 * | 4/2007 | Malthe et al. | ................. | 353/119 |
| 2007/0191028 A1 | 8/2007 | Hinckley et al. | | |
| 2007/0210937 A1 * | 9/2007 | Smith et al. | ................. | 340/995.1 |
| 2008/0018591 A1 * | 1/2008 | Pittel et al. | ................. | 345/156 |
| 2008/0129894 A1 * | 6/2008 | Kang et al. | ................. | 348/758 |
| 2009/0073393 A1 * | 3/2009 | Lee et al. | ................. | 353/94 |
| 2009/0124906 A1 * | 5/2009 | Caluser | ................. | 600/443 |
| 2010/0014056 A1 * | 1/2010 | Mitsuhashi et al. | ................. | 353/69 |
| 2010/0066675 A1 | 3/2010 | Wilson et al. | | |
| 2010/0099456 A1 * | 4/2010 | Kim | ................. | 455/556.1 |
| 2010/0130259 A1 * | 5/2010 | Lee | ................. | 455/566 |
| 2010/0291993 A1 * | 11/2010 | Gagner et al. | ................. | 463/25 |

OTHER PUBLICATIONS

First Office Action with date of dispatch of Aug. 20, 2013 in Chinese Patent Application No. 201110184625.4, 17 pages.
English Abstract of CN1964766 published May 16, 2007.
English Abstract of CN101499108 published Aug. 5, 2009.
Machine Translation of Description and Claims of CN101499108 published Aug. 5, 2009, translation generated by Patent Translate, accessible via espacenet.com on Oct. 29, 2013.
Response to Office Action filed on Jan. 3, 2014 in Chinese Patent Application No. 201110184625.4, with English Summary of the Argumetns and English translation of the amended Claims, 23 pages.
Office Action dated Apr. 17, 2014 in Chinese Patent Application No. 201110184625.4, with English Summary, 7 pages.
Response to Office Action filed on Jul. 1, 2014 in Chinese Patent Application No. 201110184625.4, with English Summary of the Arguments, 33 pages.
Notice of Allowance dated Oct. 21, 2014 in Chinese Patent Application No. 201110184625.4, with English Summary of the notice of English translation of the allowed Claims, 9 pages.

* cited by examiner

COORDINATING DEVICE INTERACTION TO ENHANCE USER EXPERIENCE

BACKGROUND OF THE INVENTION

Mobile computing devices such as personal desktop assistants, personal digital assistants, mobile phones, hand-held and pocket-sized computers and tablet personal computers provide users with a platform to access and exchange information. Mobile computing devices are compact, easy to transport and provide a host of features and services, such as communications, information storage and retrieval and multimedia entertainment. Users typically interact with applications and features in a mobile computing device via a display screen which may be a touch sensitive screen and one or more physical controls on the mobile computing device. However, the area available for user interaction via the display screen is still relatively small in comparison to the size of, for example, a television or a monitor for a desktop computer.

SUMMARY

Technology is disclosed by which user experience for users participating in an interactive activity is enhanced based on coordinating an interaction between one or more computing devices associated with the users. In one embodiment, the interactive activity is an interactive game, such as a multiplayer game that users may wish to participate in. The computing devices may include, for example, one or more mobile computing devices such as a cell phone, web-enabled smart phone, a personal digital assistant, a palmtop computer, a laptop computer, one or more head mounted devices or one or more projection devices. An interaction between the computing devices is achieved by establishing a coordination between the computing devices relative to a reference point on a physical surface on which the interactive activity may be rendered for the users. An image of the interactive game is rendered to the users relative to the reference point on the physical surface. The rendered image provides users with an enhanced viewing experience while participating in the interactive activity.

In one embodiment, a method for coordinating interaction between one or more computing devices for one or more users participating in an interactive activity is disclosed. A reference point is identified on a physical surface via a primary computing device. The primary computing device may include a mobile computing device. The physical surface is utilized to render an interactive activity for one or more users. The interactive activity may be an interactive game, in one embodiment. The reference point is communicated to one or more secondary computing devices, via the primary computing device. The secondary computing devices may include, but are not limited to, one or more additional mobile computing devices, head mounted display devices or projection devices. An interaction between the primary computing device and the secondary computing devices is coordinated utilizing the reference point. A user perspective image of the interactive game relative to the reference point is rendered on the physical surface or on the one or more secondary computing devices via the primary computing device and the secondary computing devices to the users.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Disclosed herein is a method and system for providing interactive mechanisms for computing devices to enhance user participation in an interactive activity. In one embodiment, an interaction between computing devices is coordinated by identifying a reference point on a physical surface on which an interactive activity, such as an interactive game may be rendered. User gestures on the physical surface on which the interactive game is rendered are sensed via one or more sensors in the computing devices. A result of an action associated with the user gestures on the physical surface on which the interactive game is rendered is displayed to the users. In one set of operations performed by the disclosed technology, a user perspective image of the interactive game is rendered to users via head mounted display (HMD) devices that are physically coupled to one or more mobile computing devices. In another set of operations performed by the disclosed technology, an interactive game is projected relative to a reference point onto a physical surface on which the interactive game is rendered, via a projection device coupled to a mobile computing device. In yet another set of operations performed by the disclosed technology, a projected image may be rendered onto a physical surface relative to a reference point via a primary mobile computing device. A portion of the projected image may be re-projected via a secondary mobile computing device as a magnified image to a user, thereby enhancing a user's experience while interacting with an activity rendered on the physical surface.

Figure 1A:
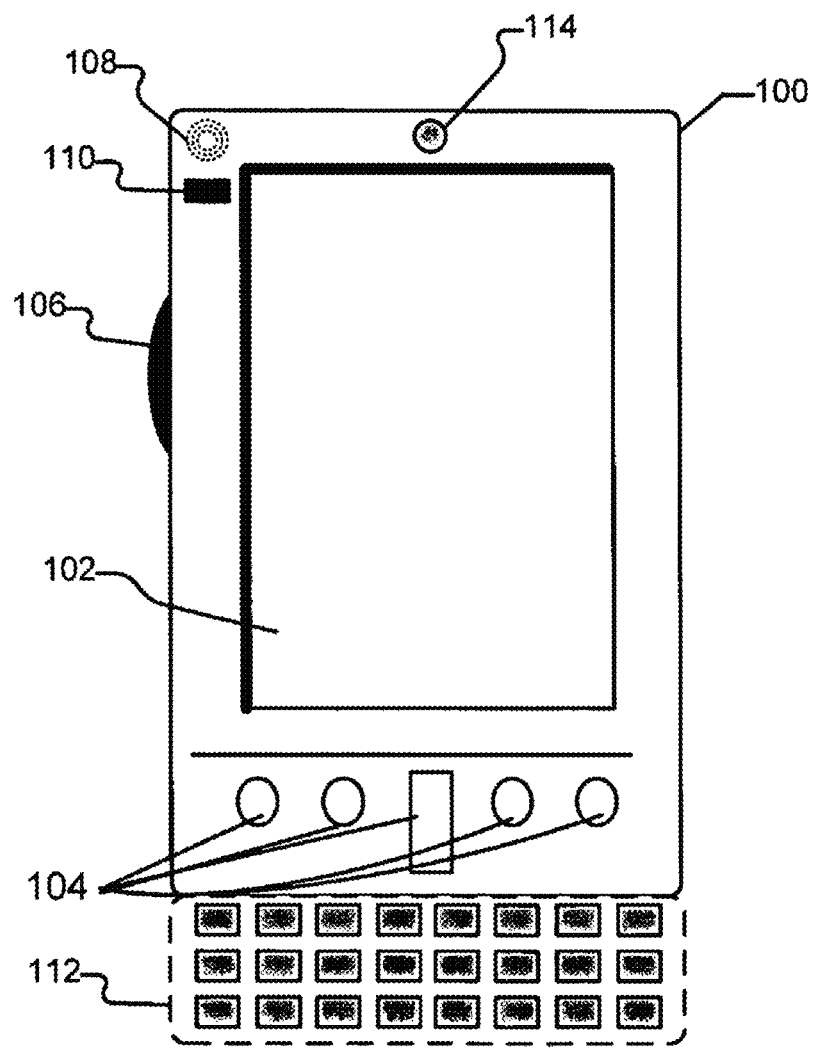
FIG. 1A illustrates an exemplary computing device for implementing the operations of the disclosed technology.

FIG. 1A illustrates an exemplary computing device for implementing the operations of the disclosed technology. In one embodiment, the computing device is a mobile computing device 100, which may include, but is not limited to, a cell phone, web-enabled smart phone, a personal digital assistant, a palmtop computer, a laptop computer or any similar device which communicates via wireless signals. Mobile computing device 100 may include both input elements and output elements. Input elements may include a touch screen display 102 and input buttons 104 that allow a user to enter information into the mobile computing device 100. Mobile computing device 100 also incorporates a side input element 106 for enabling further user input. Side input element 106 may be a rotary switch, a button, or any other type of manual input element. In alternative embodiments, mobile computing device 100 may incorporate more or less input elements. For example, display 102 may not be a touch screen in some embodiments. Mobile computing device 100 may also include an optional keypad 112. Optional keypad 112 may be a physical keypad or a "soft" keypad generated on the touch screen display. Yet another input device that may be integrated to mobile computing device 100 is an on-board camera 114.

Figure 1B:
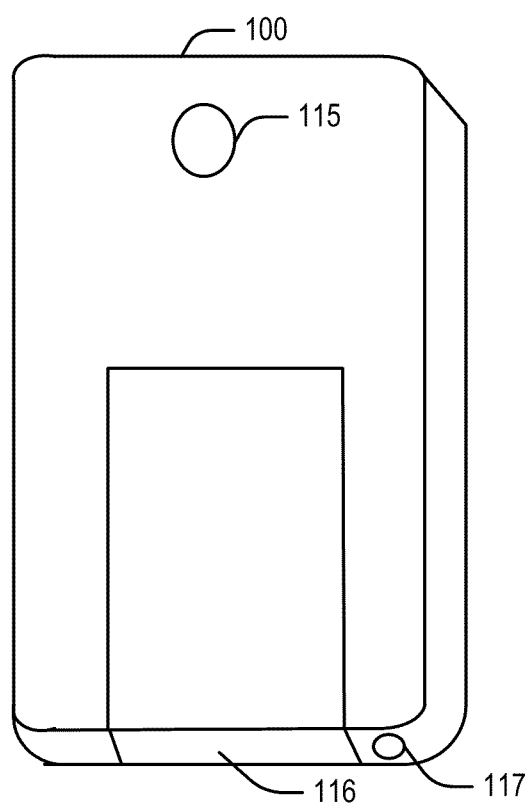
FIG. 1B illustrates a rear view of the computing device shown in FIG. 1A.

FIG. 1B illustrates a rear view of the computing device shown in FIG. 1A. In one embodiment, mobile computing device 100 includes a rear facing camera 115. The rear facing camera 115 may be located opposite to the touch screen display 102 to enable a user to view the object of the photograph past the mobile computing device 100 and on the display 102. The mobile computing device 100 may also include a back input element, such as a charge interface 117 and a battery 116 as shown in FIG. 1B.

Mobile computing device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments, the disclosed technology may also be used in combination with any number of computer systems, such as in desktop environments, laptop or notebook computer systems, multiprocessor systems, micro-processor based or programmable consumer electronics, network PCs, mini computers, main frame computers and the like. To summarize, any computer system having a plurality of environment sensors, a plurality of output elements to provide notifications to a user and a plurality of notification event types may incorporate embodiments of the present invention.

Figure 2:
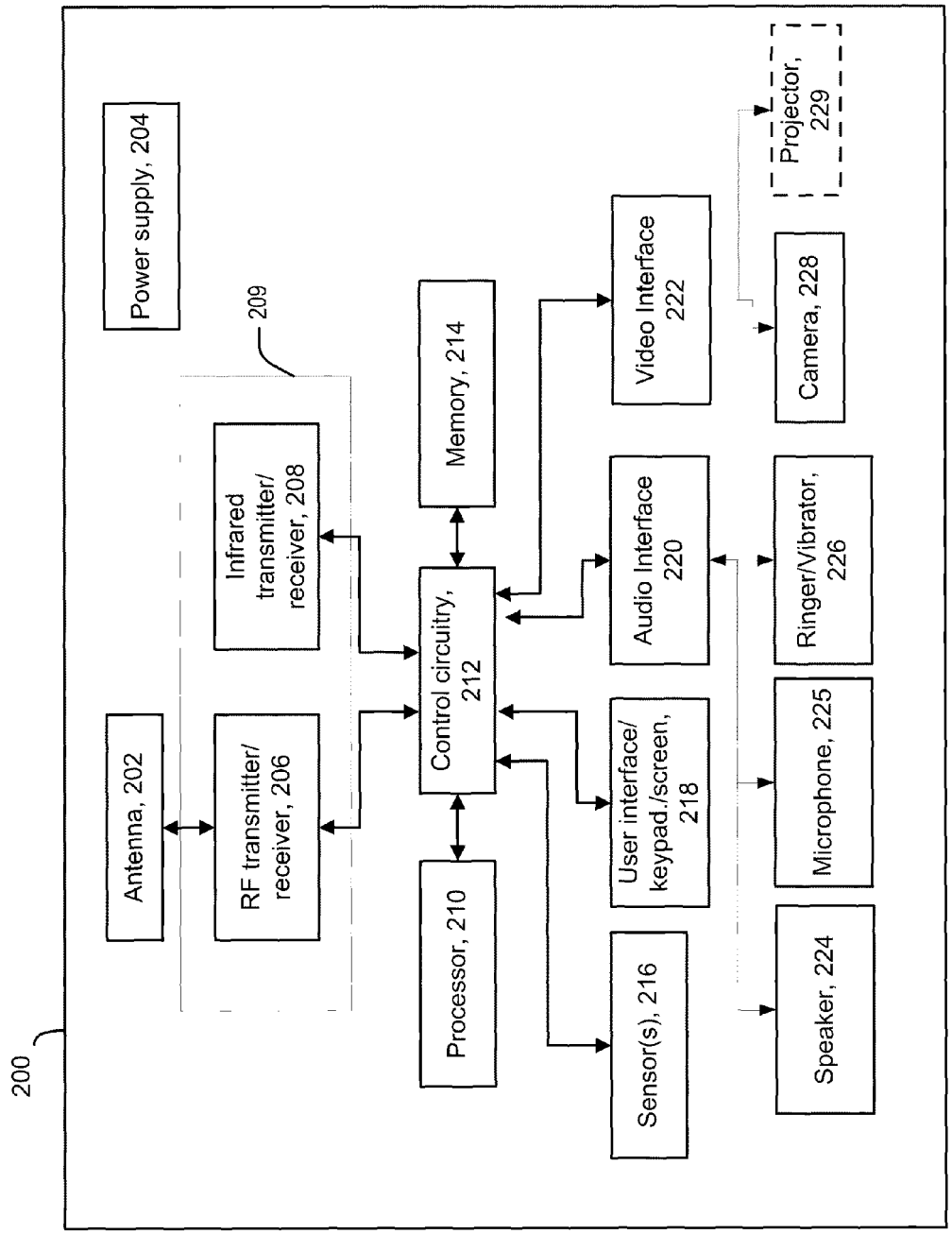
FIG. 2 is a block diagram of a system illustrating the functional components of a mobile computing device shown in FIG. 1.

FIG. 2 is a block diagram of a system illustrating the functional components of a mobile computing device, such as mobile computing device 100 shown in FIG. 1. As shown in FIG. 2, a system 200 implementing mobile computing device 100 may include control circuitry 212 that may include one or more processors 210, and storage or memory 214, such as, for example, non-volatile memory such as ROM and volatile memory such as RAM. Memory 214 stores processor-readable code which is executed by one or more of the processors 210 of the control circuitry 212 to implement the operations of the disclosed technology. One or more application programs may be loaded into memory 214, such as phone dialer programs, e-mail programs, PIM (personal information management) programs, internet browser applications, video game applications and so forth.

The control circuitry 212 may include a communication interface 209 that controls the transmission and reception of signals between the mobile computing device and other devices wirelessly or via a wired connection. As illustrated, in one embodiment, communication interface 209 may include Radio Frequency (RF) transmit/receive circuitry 206 and/or Infrared transmit/receive circuitry 208 for the transmission and reception of wireless signals. During a transmission mode, the control circuitry 212 may provide voice and other data signals to the transmit/receive circuitry 206. The transmit/receive circuitry 206 may transmit the signal to a remote station (e.g., a fixed station, operator, other mobile computing devices, etc.) via antenna 202.

Control circuitry 212 may also communicate with one or more sensor(s) 216, a user interface/keypad screen 218, an audio interface 220 and a video interface 222. The sensor(s) 216 may include, for example, motion detection sensors such as accelerometers, pressure sensors, proximity sensors, capacitive touch sensors and the like. Accelerometers have been incorporated into mobile devices to enable applications such as intelligent user interfaces that let users input commands through gestures, indoor GPS functionality which calculates the movement and direction of the mobile device after contact is broken with a GPS satellite, and to detect the orientation of the device and automatically change the display from portrait to landscape when the mobile device is rotated. An accelerometer may be provided, e.g., by a micro-electromechanical system (MEMS) which is built onto a semiconductor chip. Acceleration direction, as well as orientation, vibration and shock can be sensed via the accelerometers.

The User Interface keypad/screen 218 may include a keypad such as a push button numeric dialing pad (such as on a typical telephone) or a multi-key keyboard (such as a conventional keyboard). The UI keypad/screen 218 may also be touch-sensitive and include a liquid crystal display (LCD) or any other type of display commonly used in mobile devices. Audio interface 220 may be used to provide audible signals to and receive audible signals from the user. Audio interface 220 may be coupled to a speaker 224, a microphone 225 and a ringer/vibrator 226. The ringer/vibrator 226 may be used to signal an incoming call, text message, calendar reminder, alarm clock reminder, or other notification to the user. The ringer/vibrator 226 can emit one or more ring tones which are selected by the user and/or tactile vibrations. During a receiving mode, the transmit/receive circuitry 206 receives a voice or other data signal from a remote station through the antenna 202. A received voice signal may be provided to the speaker 222 while other received data signals are also processed appropriately. The microphone 225 may include a transducer that may receive and convert sound into an electrical signal. The microphone 225 may also include a pressure sensor or an audio sensor to facilitate the sensing of user gestures and the control of notifications.

Video interface 222 may be used to provide video, images and other signals to users. Video interface 222 may also be used to receive video, images and other signals from camera 228 and projector 229. Camera 228 may be used to capture images and/or video that may be displayed on the user interface screen 218. Camera 228 may also include one or more depth sensors that may capture, sense or detect a user's actions or gestures in a field of view of the mobile computing device. Projector 229 may optionally be integrated into mobile computing device to allow for the projection and display of images captured by the camera 228 on a physical surface on which the mobile computing device may be placed.

System 200 may include a power supply 204, which may be implemented as one or more batteries. Power supply 204 may further include an external power source, such as an AC adapter or a powered docking cradle that supplements or recharges the batteries. A mobile computing device implementing system 200 may have additional features or functionality. For example, the device may also include additional data storage devices (removable and/or non-removable) such as, magnetic disks, optical disks, or tape. Computer storage media may include volatile and nonvolatile, removable and non-removable media implemented in any method or technology for storage of information, such as computer readable instructions, data structures, program modules, or other data.

Figure 3:
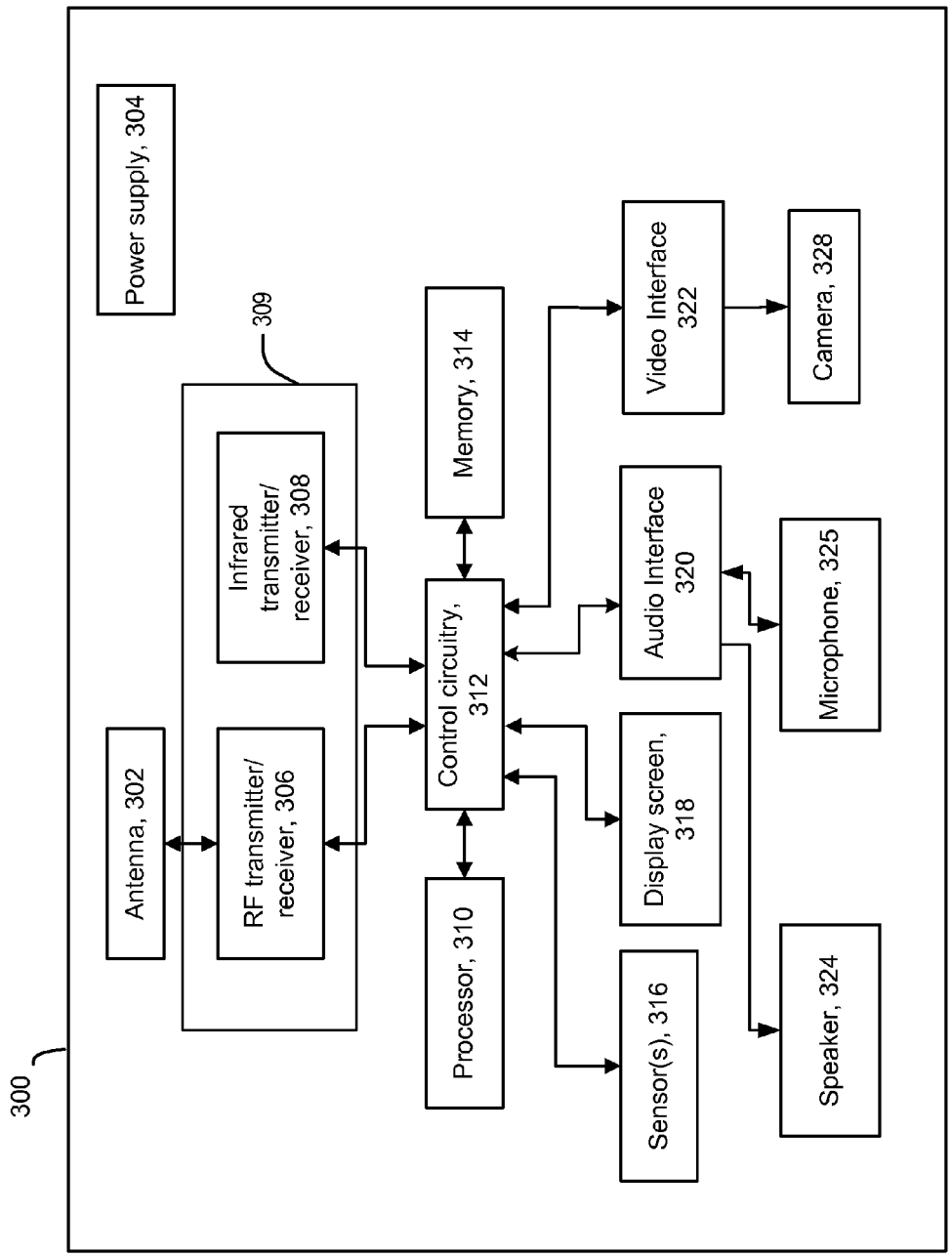
FIG. 3 is a block diagram of a system illustrating the functional components of a head mounted display device that may be utilized to perform one or more operations of the disclosed technology.

FIG. 3 is a block diagram of a system illustrating the functional components of a head mounted display device that may be utilized to perform one or more operations of the disclosed technology. As will be appreciated, a head mounted display (HMD) device typically refers to a type of device that may be mounted on a user's head. A HMD device may include a display screen that may display video images in front of the user's eyes when the user wears the HMD device. A HMD device may additionally include two frame-rod sections which may be extended from the display screen and which may be placed on a user's ears, when the user wears the HMD device. In one embodiment, a system 300 implementing a HMD device may include control circuitry 312 that may include one or more processors 310, and storage or memory 314, such as, for example, non-volatile memory such as ROM and volatile memory such as RAM. Memory 314 stores processor-readable code which is executed by one or more of the processors 310 of the control circuitry 312 to implement the operations of the disclosed technology. In one embodiment, memory 314 may be used to store image based content which may be displayed on a display screen 318 of the HMD device.

Control circuitry 312 may include a communication interface 309 that controls the transmission and reception of signals between the HMD device and other devices wirelessly or via a wired connection. As illustrated, in one embodiment, communication interface 309 may include Radio Frequency (RF) transmit/receive circuitry 306 and/or Infrared transmit/receive circuitry 308 for the transmission and reception of wireless signals. During a transmission mode, the control circuitry 312 may provide voice and other data signals to the transmit/receive circuitry 306. The transmit/receive circuitry 306 may transmit the signal to a remote station (e.g., a fixed station, operator, a mobile computing device, etc.) via antenna 302.

Control circuitry 312 may also communicate with one or more sensor(s) 316, a display screen 318, an audio interface 320 and a video interface 322. The sensor(s) 316 may include, for example, motion detection sensors, such as accelerometers which may detect a movement of the head of the user wearing the HMD device, pressure or touch sensors which may detect whether or not the user has worn the HMD device and proximity sensors which may detect one or more objects around the user or other devices that may be coupled to the HMD device.

The display screen 318 may include optical components (not shown) that may enhance a user's viewing experience while displaying images to a user. The display screen 318 may be placed in a frame of the HMD device in front of the user's eyes. In one embodiment, and as will be discussed in greater detail below, the HMD device may be coupled to a portable electronic device, such as mobile computing device 100 described in FIG. 1A to provide a user with an enhanced viewing experience while participating in an interactive activity such as, for example, an interactive game. Accordingly, in one embodiment, the display screen 318 of the HMD device may utilize the display screen of the mobile computing device 100 shown in FIG. 1A to display images to a user, when the HMD device is worn on the user's head. In one embodiment, display screen 318 may be configured to render a user perspective image of an interactive game on a physical surface to a user, to provide the user with an enhanced viewing experience.

Audio interface 320 may be used to provide audible signals to and receive audible signals from the user. Audio interface 320 may be coupled to a speaker 324, and a microphone 325, in one embodiment. During a receiving mode, the transmit/receive circuitry 306 receives a voice or other data signal from a remote station through the antenna 302. A received voice signal may be provided to the speaker 324 while other received data signals are also processed appropriately. The microphone 325 may include a transducer or sensor that may receive and convert sound into an electrical signal. The microphone 325 may also include a pressure sensor or an audio sensor to facilitate the sensing of user gestures and the control of notifications.

Video interface 322 may be used to provide video, images and other signals to users. Video interface 322 may also be used to receive video, images and other signals from camera 328. Camera 328 may be used to capture images and/or video that may be viewed on the display screen 318. Camera 328 may also include one or more depth sensors that may capture, sense or detect a user's actions or gestures in a field of view of the HMD device.

System 300 may include a power supply 304, which may be implemented as one or more batteries. Power supply 304 may further include an external power source, such as an AC adapter or a powered docking cradle that supplements or recharges the batteries. System 300 implementing a HMD device may have additional features or functionality. For example, system 300 may also include additional data storage devices (removable and/or non-removable) such as, magnetic disks, optical disks, or tape. Computer storage media may include volatile and nonvolatile, removable and non-removable media implemented in any method or technology for storage of information, such as computer readable instructions, data structures, program modules, or other data.

Figure 4A:
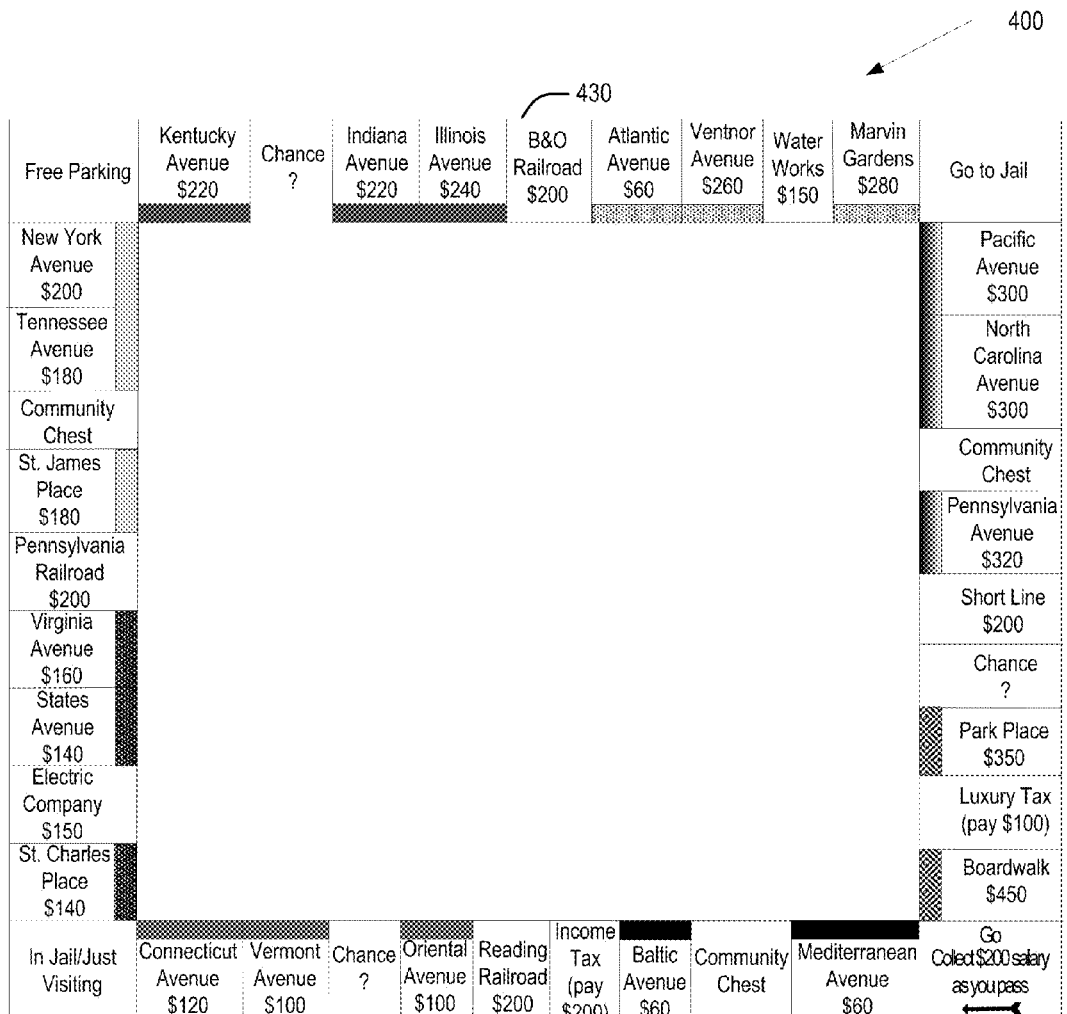
FIG. 4A illustrates a suitable environment for enhancing user experience for users participating in an interactive activity, based on coordinating an interaction between one or more computing devices.
Figure 4A:
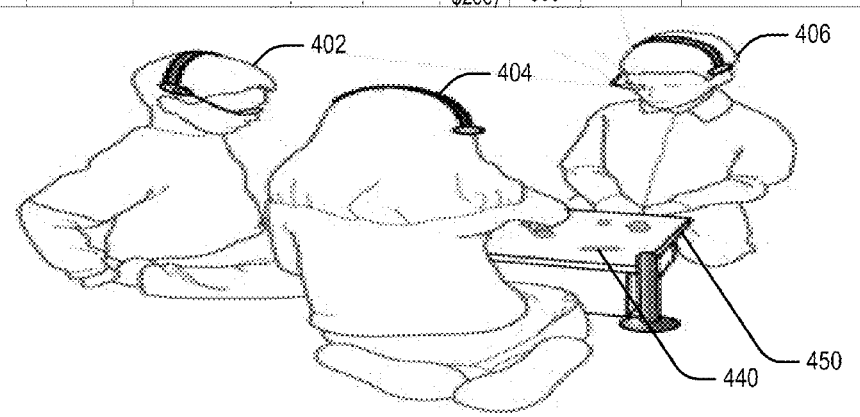

FIG. 4A illustrates a suitable environment 400 for enhancing user experience for users participating in an interactive activity, based on coordinating an interaction between one or more computing devices. In accordance with the disclosed technology, users 402, 404 and 406 may participate in an interactive activity such as, for example, an interactive game 430 by invoking a game application from their respective mobile computing devices. Coordination between the computing devices may be established by identifying a reference point 440 on a physical surface 450 on which the interactive game 430 may be rendered. A user perspective image of the interactive game 430 may be rendered to users 402, 404 and 406 via their computing devices relative to the reference point 440 on the physical surface 450. An exemplary implementation of the environment 400 is described in detail in FIG. 4B.

Figure 4B:
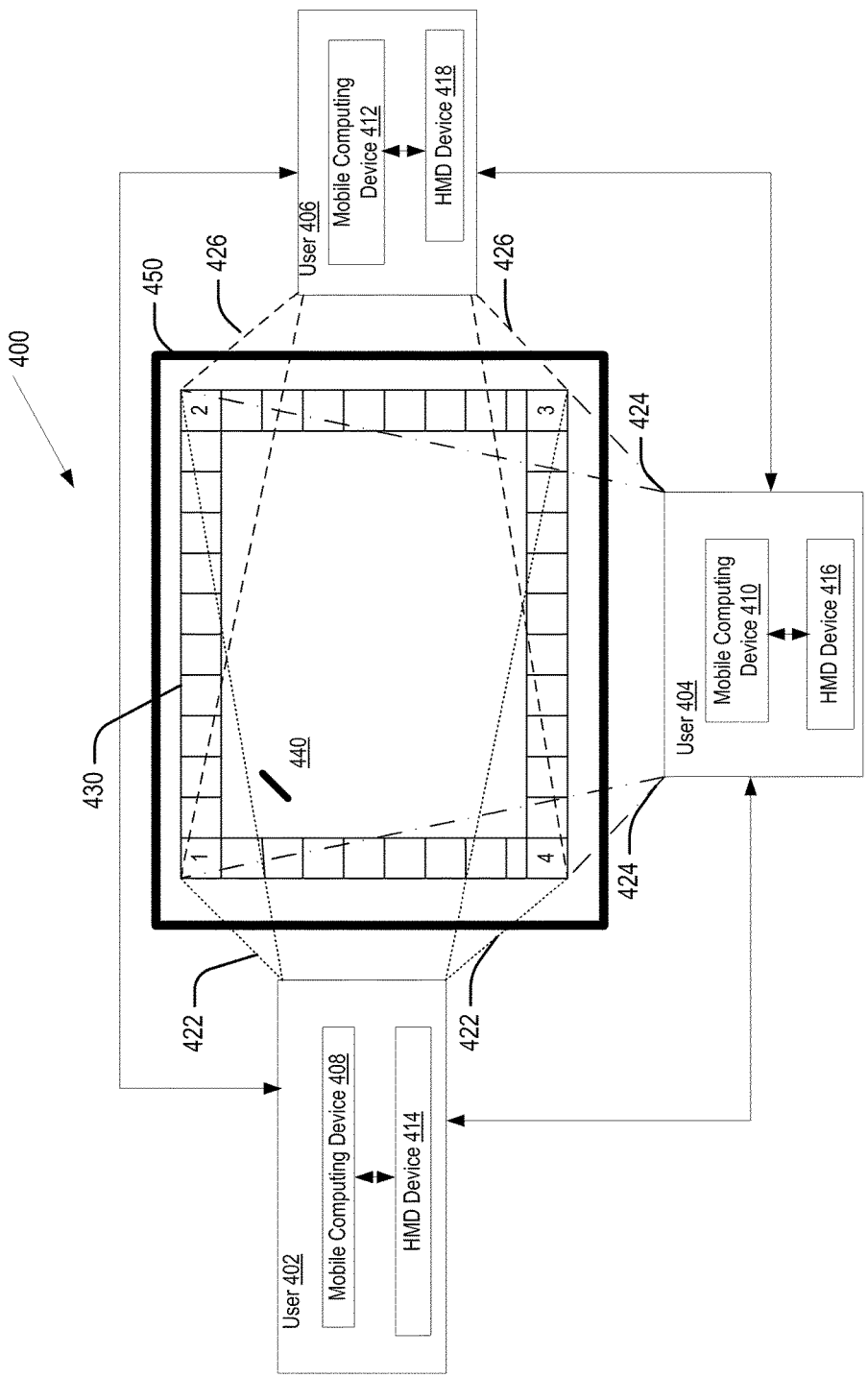
FIG. 4B is a schematic block diagram illustrating an exemplary implementation of the environment shown in FIG. 4A.

FIG. 4B is a schematic block diagram illustrating an exemplary implementation of the environment 400 shown in FIG. 4A for enhancing user experience for users participating in an interactive activity, based on coordinating an interaction between one or more computing devices. In one embodiment, the computing devices may include, for example, a mobile computing device as discussed in FIGS. 1 and 2 or a head mounted display device as discussed in FIG. 3. In the illustrated embodiment, users 402, 404 and 406 may communicate with each other via their respective mobile computing devices 408, 410 and 412 as well as verbally and inter personally to participate in an interactive activity such as, for example, an interactive game by invoking a game application from their respective mobile computing devices. Communication between mobile computing devices 408, 410 and 412 may be initially established using any wired or wireless communication protocol known in the art such as, for example, Bluetooth™, Radio Frequency or the like. Additional details relating to establishing a connection between mobile computing devices are set forth in co-pending published patent application, US20070191028, entitled, "Dynamic Interconnection of Mobile Devices" filed Aug. 29, 2006, which is incorporated herein by reference in its entirety.

In accordance with the disclosed technology, coordination between mobile computing devices 408, 410 and 412 may be established by identifying a reference point on a physical surface on which the interactive game 430 may be rendered. A user perspective image of the interactive game 430 may then be rendered to each of the users 402, 404 and 406 via mobile computing devices 408, 410 and 412 relative to the reference point. As will be discussed below, the disclosed technology of rendering a user perspective image provides users 402, 404 and 406 with an enhanced viewing experience while participating in the interactive game 430.

An exemplary reference point 440 on a physical surface 450 is shown in FIG. 4B. The reference point 440 may include, for example, any physical frame of reference such as a physical object, a sensing device or another mobile computing device that may be placed on the physical surface 450. The sensing device may include one or more active beacon sensors that emit structured light, pulsed infrared light or visible light onto the physical surface 450 and detect backscattered light from the surface of one or more objects on the physical surface 450. The physical surface 450 may include, for example, a table top that may serve as a game input area or an interactive surface area on which interactive game 430 may be rendered to users 402, 404 and 406. In one embodiment, one of the mobile computing devices 408, 410 or 412 acts as a primary mobile computing device to identify a reference point as a physical frame of reference relative to which mobile computing devices 408, 410 and 412 may coordinate with each other on. Once identified, the primary mobile computing device may communicate the reference point to one or more secondary computing devices. Any suitable algorithm may be utilized by mobile computing devices 408, 410 and 412 to designate a particular mobile computing device as a primary mobile computing device. In one embodiment, a reference point may be identified by the primary mobile computing device as a physical frame of reference relative to which mobile computing devices 408, 410 and 412 may coordinate with each other on by determining the proximity of the mobile computing devices 408, 410 and 412 relative to the reference point on the physical surface 450 and the proximity of the mobile computing devices 408, 410 and 412 relative to each other. A user perspective image of the interactive game 430 relative to the reference point 440 may then be rendered on the physical surface 450 to each of the users 402, 404 and 406, via mobile computing devices 408, 410 and 412.

In one embodiment, a user perspective image of the interactive game 430 may be rendered to users 402, 404 and 406 via head mounted display (HMD) devices 414, 416 and 418 that may be physically coupled to mobile computing devices 408, 410 and 412 respectively. Specifically, a display screen in HMD devices 414, 416 and 418 may utilize image based content related to the interactive game displayed in mobile computing devices 408, 410 and 412 to display a user perspective image of the interactive game 430 to users 402, 404 and 406. The HMD devices 414, 416 and 418 may render a user perspective image of the interactive game 430 to users 402, 404 and 406 relative to the reference point 440 on the physical surface 450, as discussed below. For example, and as shown in the exemplary illustration in FIG. 4B, a projection of the interactive game 430 relative to the reference point 440 on the physical surface 450 via HMD device 414 renders to user 402, a user perspective image, at a viewing angle 422, in which objects 1 and 4 in the interactive game 430 may appear closer to user 402 than objects 2 and 3 in the interactive game 430. Similarly, a projection of the interactive game 430 relative to the reference point 440 on the physical surface 450 via HMD device 416 renders to user 404, a user perspective image, at a viewing angle 424, in which objects 3 and 4 may appear closer to user 404 than objects 1 and 2 and a projection of the interactive game 430 relative to the reference point 440 on the physical surface 450, via HMD device 418 renders to user 406, a user perspective image, at a viewing angle 426, in which objects 2 and 3 may appear closer to user 406 than objects 1 and 4.

A physical coupling of HMD devices 414, 416 and 418 to mobile computing devices 408, 410 and 412 may be achieved using a wired connection or a wireless connection between the devices. A communication interface, such as interface 209 discussed in FIG. 2 may be utilized to enable the communication and operability of mobile computing devices 408, 410 and 412 to respective HMD devices 414, 416 and 418. The communication interface may enable the communication between the devices by transmitting/receiving desired signals between the devices using, for example, any wireless protocol known in the art such as, Bluetooth™, Radio Frequency or the like.

The interactive game 430 rendered on the physical surface 450 may be utilized as a game input area by users 402, 404 and 406 for participation in the interactive game 430. User interaction with the interactive game 430 may be captured by a camera (such as, camera 228 in system 200) in mobile computing devices 408, 410 and 412 or by a camera (such as, camera 328 in system 300) in HMD devices 414, 416 and 418. Additionally, user gestures on the physical surface 450 on which interactive game 430 may be rendered may be sensed by one or more sensors in the camera in mobile computing devices 408, 410 and 412 or one or more other sensors (such as sensors, 216 in system 200) in mobile computing devices 408, 410 and 412. Alternatively, one or more sensors (such as, sensors 316 in system 300) in HMD devices 414, 416 and 418 or one or more sensors in the camera in HMD devices 414, 416 and 418 may also be utilized to sense user gestures. Or, for example, user gestures may be sensed directly via one or more capacitive touch sensors included in the mobile computing devices 408, 410 and 412. In one embodiment, user gestures may also be sensed by the reference point itself, which may include a sensing device, in one embodiment. Additionally, sensors, (such as, sensors 216 or 316 or sensors in cameras, 228 and 328) may utilize hover or touch sensing techniques to detect and sense user gestures on the physical surface 450. Further details relating to the sensing and detection of user gestures for use with the present technology are set forth in copending published patent application number US20100066675, entitled, "Compact Interactive Tabletop with Projection-Vision", filed Sep. 4, 2009, which is incorporated herein by reference in its entirety.

The user gestures may be processed by mobile computing devices 408, 410 and 412. A result of an action associated with the user gestures may be displayed on the interactive game 430 to the users 402, 404 and 406, via their respective HMD devices 414, 416 and 418. Alternatively, the result of an action associated with the user gestures may be rendered on HMD devices 414, 416 and 418. In one embodiment, the display screen of HMD devices 414, 416 and 418 may be configured to render private information associated with the interactive game 430 to users 402, 404 and 406 by overlaying the private information on top of public or shared information associated with the interactive game 430. Accordingly, private information associated with the interactive game 430 may be visible to each individual user, via, for example, the display screen in the user's HMD device, while the public or shared information related to the interactive game 430 may be rendered onto the physical surface 450 to users 402, 404 and 406.

Figure 5:
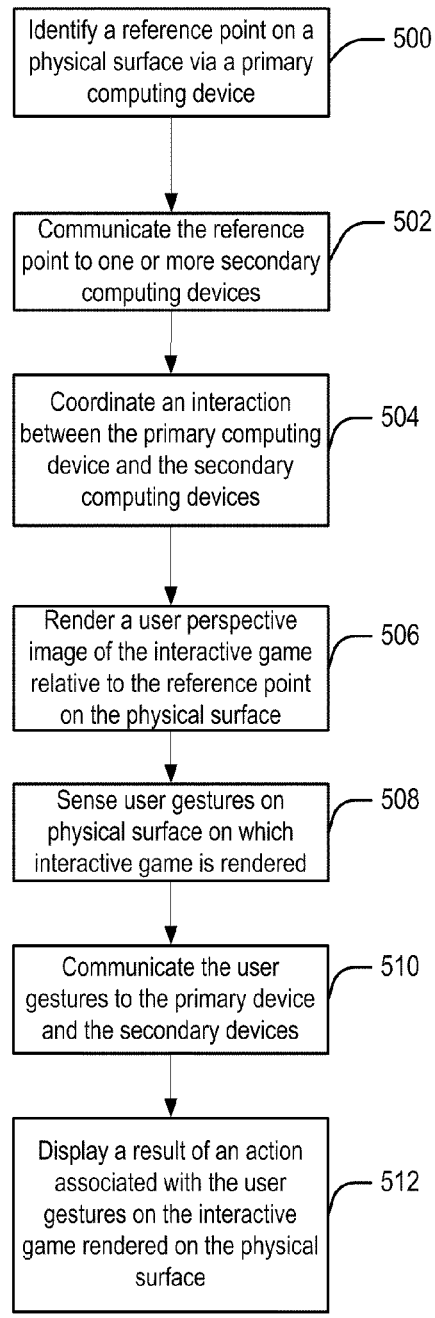
FIG. 5 is a flowchart illustrating one or more operations performed by the disclosed technology for coordinating interaction between one or more computing devices associated with one or more users of an interactive activity.

FIG. 5 is a flowchart illustrating one or more operations performed by the disclosed technology for coordinating interaction between one or more computing devices associated with one or more users of an interactive game. In one embodiment, the steps of FIG. 5 may be performed by executable instructions in a processor, such as processor 210 in a system implementing a mobile computing device such as, mobile computing device 100 shown in FIG. 1A. Alternatively, the steps of FIG. 5 may be performed by executable instructions in a processor, such as processor 310 in a system implementing a computing device, such as, a head mounted device as discussed in FIG. 3. In step 500, a reference point is identified on a physical surface upon which an interactive game may be rendered for one or more users, via a primary computing device. In one embodiment, the primary computing device may be a mobile computing device as discussed in FIG. 4B. The reference point may include, for example, any physical frame of reference such as a physical object, a sensing device or another mobile computing device that may be placed on the physical surface upon which the interactive game may be rendered. The physical surface may include, for example, a table top that may serve as a game input area or an interactive surface area on which the interactive game may be rendered to the users.

In step 502, the reference point is communicated to one or more secondary mobile computing devices, via the primary computing device. In step 504, the reference point is utilized to coordinate an interaction between the primary computing device and the secondary mobile computing devices as discussed in FIG. 4B. In step 506, a user perspective image of the interactive game relative to the reference point is rendered on the physical surface via the primary computing device and the secondary computing devices to the users. In step 508, user gestures on the physical surface on which the interactive game is rendered, are sensed. As discussed in FIG. 4B, one or more sensors in the primary mobile computing device or the secondary mobile computing devices may be utilized to perform the sensing. In step 510, the user gestures are communicated to the primary computing device and the secondary computing devices. In step 512, a result of an action associated with the user gestures is displayed on the physical surface on which the interactive game is rendered to the users via the primary computing device and the secondary computing devices.

Figure 6:
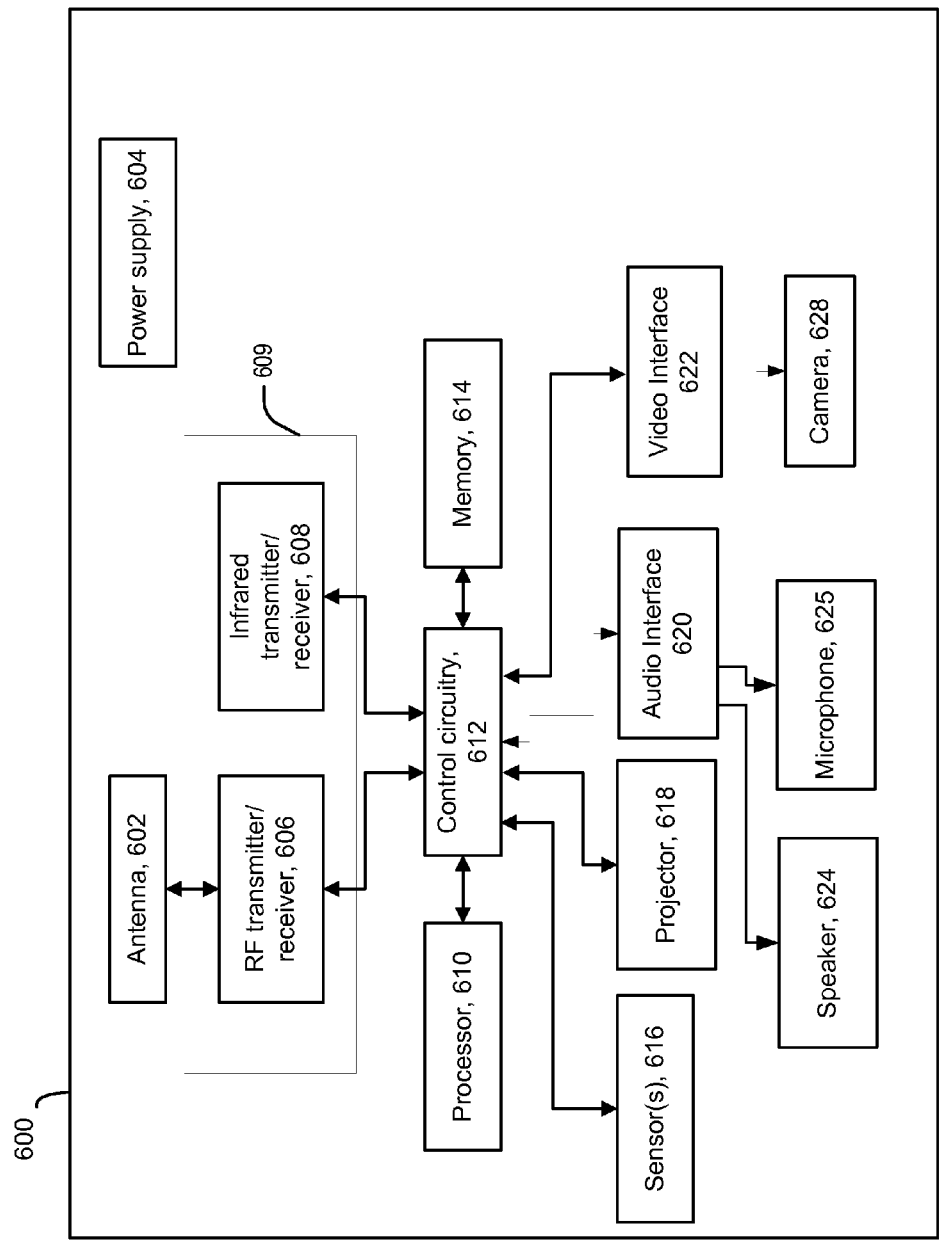
FIG. 6 is a block diagram of a system illustrating the functional components of a projection device that may be utilized to perform one or more operations of the disclosed technology.

In another embodiment, a technique for providing enhanced user experience while participating in an interactive activity may be provided by coordinating an interaction between a projection device coupled to a mobile computing device. FIG. 6 is a block diagram of a system illustrating the functional components of a projection device that may be utilized to perform one or more operations of the disclosed technology. In one embodiment, and as will be discussed in greater detail below, a projection device may be coupled to a mobile computing device, such as, mobile computing device 100 shown in FIG. 1A to provide users with an enhanced viewing experience while participating in an interactive activity, such as an interactive game. As will be appreciated, a projection device typically refers to a device configured to display video, images or computer data on a screen or other flat surface. In one embodiment, a system 600 implementing a projection device may include one or more processors 610, and storage or memory 614, such as, for example, non-volatile memory such as ROM and volatile memory such as RAM. Memory 614 stores processor-readable code which is executed by one or more of the processors 610 of the control circuitry 612 to implement one or more operations of the disclosed technology.

In one embodiment, memory 614 may be used to store image based content such as video, images, or presentation data received from other devices, such as a storage device, a DVD (Digital Versatile Disc) player, a television, a server (e.g., cable service provider server), an image capturing device, a digital camera, a video camera, a gaming console, or other computing devices (e.g., laptop, desktop, or mobile computing device) or the like. The image based content may also be temporarily stored in memory 614 as it is received and then projected by the projector 618, or may be fed directly to the projector 618, as appropriate or desired.

Control circuitry 612 may include a communication interface 609 that controls the transmission and reception of signals between the projection device and other devices wirelessly or via a wired connection. As illustrated, in one embodiment, communication interface 609 may include Radio Frequency (RF) transmit/receive circuitry 606 and/or Infrared transmit/receive circuitry 608 for the transmission and reception of wireless signals. During a transmission mode, the control circuitry 612 may provide image based content, such as presentation data or other data signals to the transmit/receive circuitry 606. The transmit/receive circuitry 606 may transmit the data and signals to a remote station (e.g., a fixed station, operator, a mobile computing device, etc.) via antenna 602.

Control circuitry 612 may also communicate with one or more sensors 616, a projector 618, an audio interface 620 and a video interface 622, in one embodiment. The sensor(s)

616 may be configured to distinguish a variety of different modes of physical contact with a projection surface on which an image may be projected by projector 618. The sensor(s) 616 may include, for example, motion detection sensors such as accelerometers, pressure sensors, proximity sensors and the like. The projector 618 may include a liquid crystal display (LCD) projector, a liquid crystal on silicon (LCOS) projector, or some other type of projector for displaying video, images or computer data onto a projection surface. Projector 618 may also permit manipulation of images or other interaction with the images by users.

Audio interface 620 may be used to provide audible signals to and receive audible signals from the user. Audio interface 620 may be coupled to a speaker 624, and a microphone 625, in one embodiment. During a receiving mode, the transmit/receive circuitry 606 receives a voice or other data signal from a remote station through the antenna 602. A received voice signal may be provided to the speaker 624 while other received data signals are also processed appropriately. The microphone 625 may include a transducer or sensor that may receive and convert sound into an electrical signal. The microphone 625 may also include a pressure sensor or an audio sensor to facilitate the sensing of user gestures on a projection surface.

Video interface 622 may be used to provide video and other signals that may be used as part of an interactive video environment. Video interface 622 may be coupled to a camera 628, in one embodiment. Camera 628 may be used to capture images and/or video that may be projected onto a projection surface by projector 618. Camera 628 may also include one or more depth sensors that may capture, sense or detect a user's actions or gestures onto a projection surface.

System 600 may include a power supply 604, which may be implemented as one or more batteries. Power supply 604 may further include an external power source, such as an AC adapter or a powered docking cradle that supplements or recharges the batteries. System 600 implementing a projection device may have additional features or functionality. For example, system 600 may also include additional data storage devices (removable and/or non-removable) such as, magnetic disks, optical disks, or tape. Computer storage media may include volatile and nonvolatile, removable and non-removable media implemented in any method or technology for storage of information, such as computer readable instructions, data structures, program modules, or other data.

Figure 7:
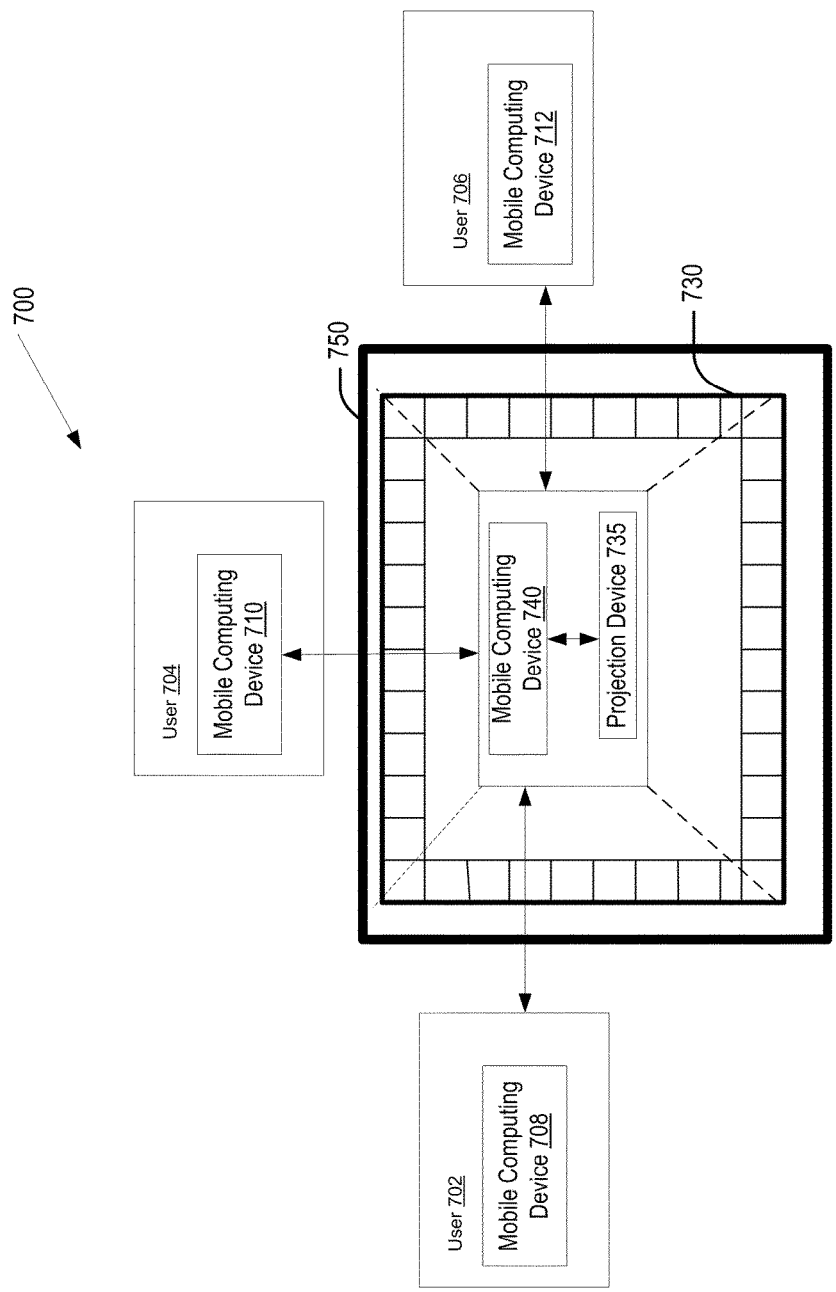
FIG. 7 is a schematic block diagram illustrating a suitable environment for enhancing user experience for users participating in an interactive activity, based on coordinating one or more computing devices, in accordance with another embodiment of the disclosed technology.

FIG. 7 is a schematic block diagram illustrating a suitable environment 700 for enhancing user experience for users participating in an interactive game, based on coordinating one or more computing devices, in accordance with another embodiment of the disclosed technology. As illustrated, an interactive game 730 may be rendered on a physical surface 750 by a primary computing device 740, which may project the interactive game 730 onto the physical surface 750 to users 702, 704 and 706. In one embodiment, the primary computing device 740 is a mobile computing device that may be coupled to a projection device 735 to project the interactive game 730 onto the physical surface 750. The mobile computing device 740 may be utilized as a reference point to enable the coordination of secondary mobile computing devices 708, 710 and 712, in this embodiment. Communication between mobile computing devices 708, 710 and 712 and 740 may be established using any wired or wireless communication protocol known in the art such as, for example, Bluetooth™, Radio Frequency or the like.

It is to be appreciated that projection device 735 may be a separate unit that is physically coupled to the mobile computing device 740, in one embodiment, or may be integrated into mobile computing device 740, in another embodiment. A physical coupling of mobile computing device 740 to projection device 735 may be achieved using a wired connection or a wireless connection between the devices. A communication interface, such as interface 209 discussed in FIG. 2 may be utilized to enable the communication and operability of mobile computing device 740 to projection device 735. The communication interface may enable the communication between the devices by transmitting/receiving desired signals between the devices using, for example, any wireless protocol known in the art such as, Bluetooth™, Radio Frequency or the like.

The interactive game 730 rendered on the physical surface 750 may be utilized as a game input area by users 702, 704 and 706 for participation in the interactive game 730. User interaction with the interactive game 730 may be captured by a camera (such as, camera 228 in system 200) in the mobile computing device 740 or a camera (such as, camera, 628, in system 600) in the projection device 735. User gestures on the physical surface 750 on which interactive game 730 is rendered may also be sensed by one or more sensors in the camera, one or more sensors in the mobile computing device or one or more sensors in the projection device, as discussed in FIG. 4B. Furthermore, sensors in camera 328, 628 may detect the actual location of the user gesture relative to the reference point 740 on the physical surface 750 (which, in this embodiment, is the mobile computing device 740) for processing by the mobile computing device 740.

Additionally, one or more sensors in a microphone (such as, microphone 225, in system 200) in the mobile computing device 740 or a microphone (such as, microphone 325, in system 300) in the projection device 735 may be utilized to sense user gestures. For example, pressure sensors or audio sensors in the microphones 225, 325 may detect an audio input or a vibration input related to a user gesture on the physical surface 750. An audio input or a vibration input may be received, for example, when a user taps or scratches the physical surface 750 on which interactive game 730 is rendered. Accordingly, the disclosed technology may provide for the detection of user gestures by combining visual information received from one or more sensors in cameras 328, 628 which may detect the actual location of where the user gesture was received on the physical surface with audio information and/or vibration information received from one or more sensors in microphones 325, 625 which may detect the actual touch associated with the user gesture on the physical surface.

The user gestures may be processed by mobile computing device 740 and communicated to the other computing devices 708, 710 and 712, which may be utilized as device controllers to enable users 702, 704 and 706 to participate in the interactive game 730. A result of an action associated with the user gestures may be displayed on the interactive game 730 projected onto the physical surface 750, to users 402, 404 and 406, via the mobile computing device 740. In one embodiment, computing devices 708, 710 and 712 may be configured to capture the projected image of the interactive game 730 displayed on the physical surface 750 and overlay the projected image on their individual display screens on top of the private information associated with the interactive game.

Figure 8:
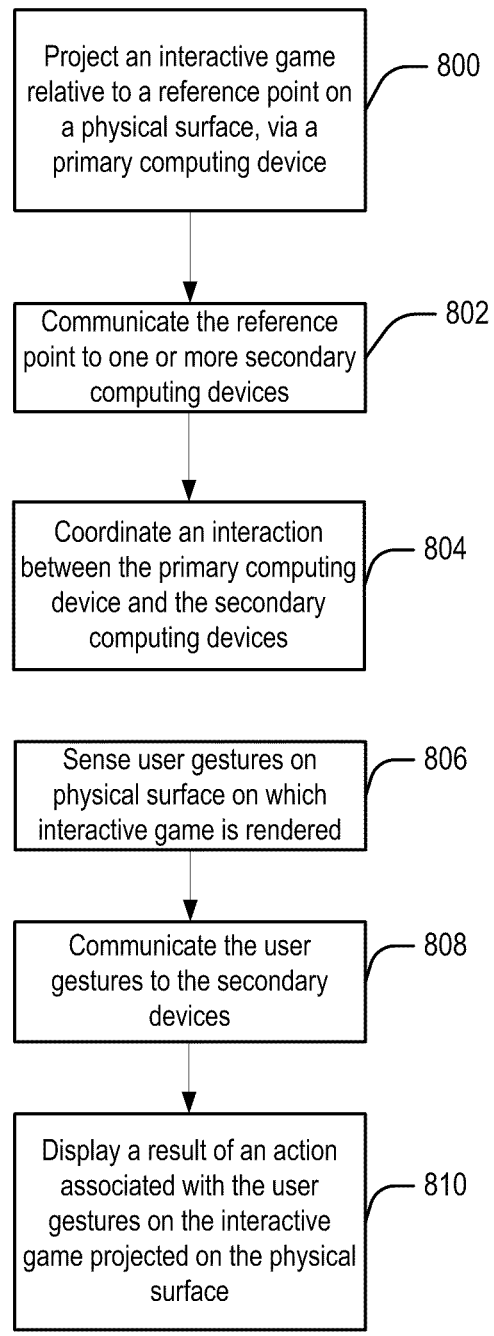
FIG. 8 is a flowchart illustrating one or more operations performed by the disclosed technology for coordinating interaction between one or more computing devices associated with one or more users of an interactive activity.

FIG. 8 is a flowchart illustrating one or more operations performed by the disclosed technology for coordinating interaction between one or more computing devices associated with one or more users of an interactive activity. In one embodiment, the steps of FIG. 8 may be performed by executable instructions in a processor, such as processor 210 in a system implementing a mobile computing device such as, mobile computing device 100 shown in FIG. 1A. Alternatively, the steps of FIG. 8 may be performed by executable instructions in a processor, such as processor 610 in a system implementing a computing device, such as, a projection device as discussed in FIG. 6.

In step 800, an interactive activity, such as an interactive game relative to a reference point is projected onto a physical surface, via a primary computing device. In one embodiment, the primary computing device may be a mobile computing device coupled to a projection device as discussed in FIG. 6. As discussed above, the reference point may include, for example, any physical frame of reference such as a physical object, a sensing device or a mobile computing device that may be placed on the physical surface upon which the interactive game may be rendered. The physical surface may include, for example, a table top that may serve as a game input area or an interactive surface area on which the interactive game may be rendered to the users.

In step 802, the reference point is communicated to one or more secondary mobile computing devices, via the primary computing device. In step 804, the reference point is utilized to coordinate an interaction between the primary computing device and the secondary mobile computing devices as discussed in FIG. 4B. In step 806, user gestures on the physical surface on which the interactive game is rendered, are sensed. As discussed in FIG. 6, one or more sensors in the mobile computing device or the projection device may be utilized to perform the sensing. In step 808, the user gestures are communicated to the primary computing device and the secondary computing devices. In step 810, a result of an action associated with the user gestures is displayed on the physical surface on which the interactive game is projected to the users via the primary computing device and the secondary computing devices.

Figure 9A:
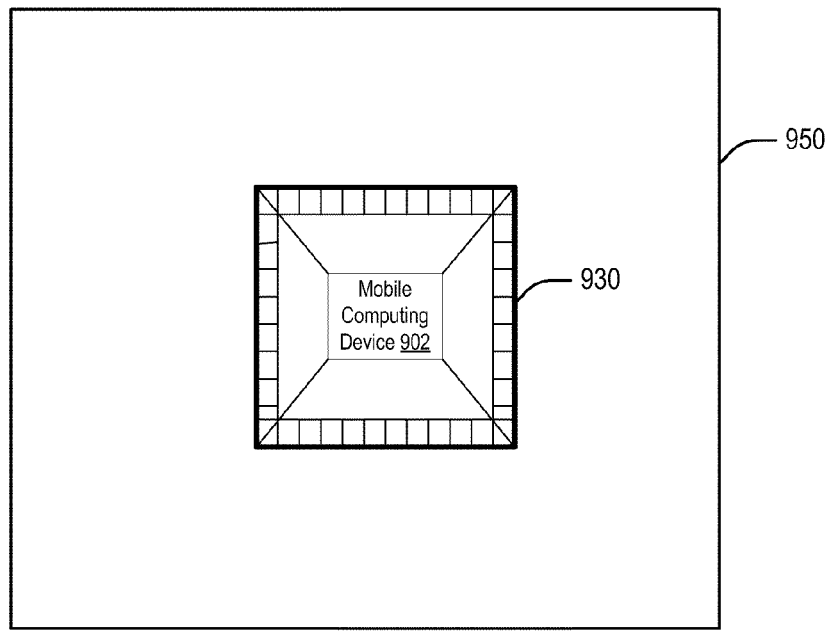
FIGS. 9A and 9B illustrate a suitable environment for implementing another embodiment of the disclosed technology.
Figure 9B:
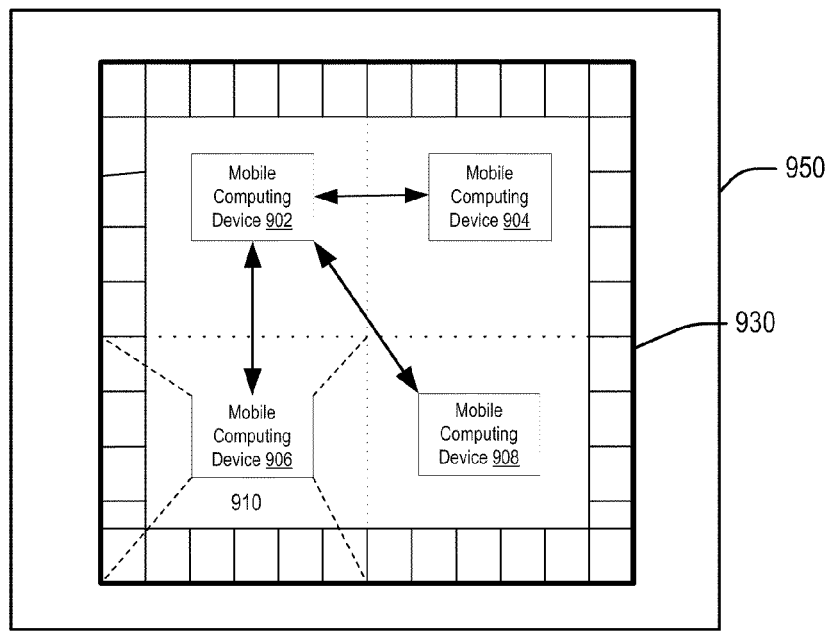

In another embodiment of the disclosed technology, two or more mobile computing devices may be connected to each other to project an even larger interactive surface area associated with an interactive game onto a physical surface. FIG. 9A illustrates an interactive game 930 that is projected onto a physical surface 950 by mobile computing device 902. For example, mobile computing device 902 may be integrated with a projection device, such as discussed in FIG. 7 to project the interactive game 930 onto the physical surface 950. FIG. 9B illustrates a tiled display surface of the interactive game 930 projected onto the physical surface 950 when mobile computing device 902 is connected to one or more mobile computing devices 904, 906 and 908. As discussed above, any wired or wireless communication protocol known in the art such as, for example, Bluetooth™, Radio Frequency or the like may be utilized by mobile computing devices 902, 904, 906 and 908 to establish a connection between each other. In addition, accelerometers in the mobile computing devices 902, 904, 906 and 906 may be used to deduce the position and orientation of the mobile computing devices 902, 904, 906 and 908 relative to each other. Additional details relating to establishing a connection between one or more mobile computing devices for communication of information between the mobile computing devices are set forth in co-pending Patent Application No. 20070191028, entitled, "Dynamic Interconnection of Mobile Devices" filed Aug. 29, 2006, which is incorporated herein by reference in its entirety.

In one embodiment, any one of the mobile computing devices 902, 904, 906 or 908 may act as a primary mobile computing device to coordinate the projection of a tiled display surface of the interactive game 930 onto the physical surface 950, via one or more secondary mobile computing devices. In the illustration shown in FIG. 9B, for example, a primary mobile computing device 902 communicates with secondary mobile computing devices 904, 906 and 908 to coordinate the projection of different portions of the interactive game 930 onto the physical surface 950. An exemplary portion 910 of the interactive game 930 projected via secondary mobile device 906 is illustrated in FIG. 9B. The primary mobile computing device 902 may similarly coordinate the projection of each portion of the projected image via each of the secondary mobile computing devices 904, 906 and 908 to project a tiled display surface of the interactive game 930 onto the physical surface 950. In one embodiment, cameras (such as, camera 228), in the mobile computing devices 902, 904, 906 and 908 may be titled or oriented to project the interactive game 930 onto the physical surface 950 so as to provide an optimal field of view for users interacting with the interactive game 930. Any suitable algorithm may be utilized to determine the optimal tilt angle in the cameras in the mobile computing devices 902, 904, 906 and 908 to provide users with an optimal field of view while interacting with the interactive game 930 projected onto the physical surface. In addition, sensors in the cameras in the mobile computing devices 902, 904, 906 and 908 may be used to sense user gestures on the physical surface 950 on which interactive game 930 is rendered, as discussed above.

Figure 10:
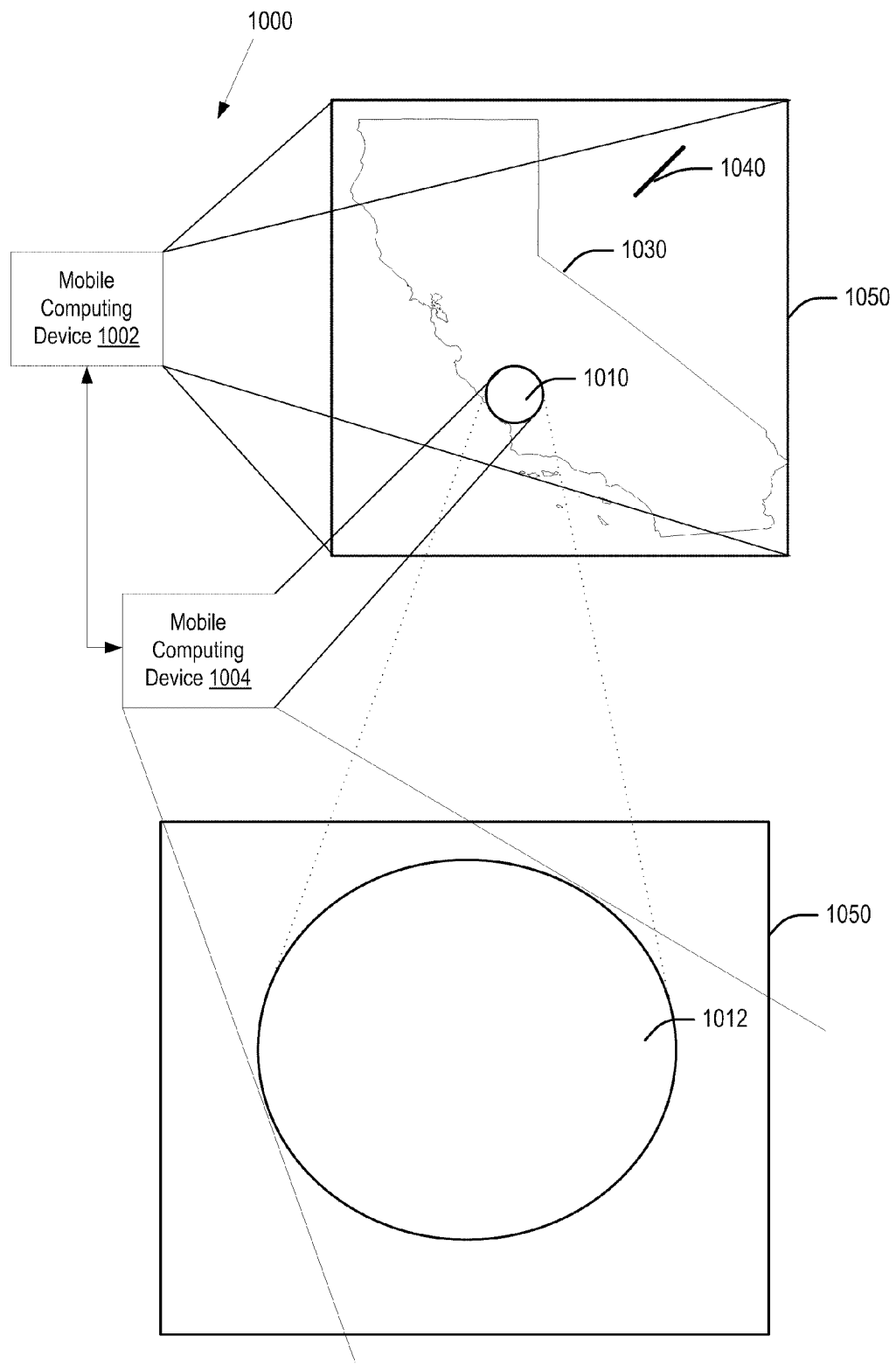
FIG. 10 is a schematic block diagram illustrating a suitable environment for enhancing user experience for users participating in an activity, based on coordinating one or more computing devices, in accordance with yet another embodiment of the disclosed technology.

FIG. 10 is a schematic block diagram illustrating a suitable environment 1000 for enhancing user experience for users participating in an activity, based on coordinating one or more computing devices, in accordance with yet another embodiment of the disclosed technology. In the illustrated embodiment, an image 1030 may be projected onto a physical surface 1050 via a primary mobile computing device, 1002. In one embodiment, the projected image 1030 may include, for example, an image of a surface map. In an alternate embodiment, a physical image may also be projected onto the physical surface 1050. In another embodiment, the projected image 1030 may also include an image of an interactive activity such as an interactive game that a user desires to interact with. A user may select a portion 1010 of the projected image 1030, via a secondary mobile computing device 1004 by moving the secondary mobile computing device 1004 over the projected image 1030. The primary mobile computing device 1002 may then determine a set of location coordinates (x-y coordinates) of the portion 1010 of the projected image 1030 selected by the user relative to a reference point 1040 on a physical surface on which the projected image 1030 is rendered. The primary mobile computing device 1002 may communicate the coordinate information to the secondary mobile computing device 1004. The secondary mobile computing device 1004 may then re-project the portion 1010 of the projected image 1030 as a magnified, high resolution projected image 1012 to the user. Alternatively, the user may select a portion 1010 of the projected image 1030 via the primary computing device 1002 by holding the primary computing device 1002 above the projected image 1030 or by setting the primary computing device 1002 directly on the projected image 1030. The primary computing device 1002 may then determine a set of location coordinates of the portion 1010 of the projected image 1030 and re-project the portion 1010 of the projected image 1030 as a magnified, high resolution projected image 1012 to the user.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A method for coordinating interaction between computing devices for participating in an interactive activity, the method comprising:
   detecting user placement of a primary computing device associated with a first user on a physical surface, the user placement indicating a user selected reference point on the physical surface;
   identifying the user selected reference point on the physical surface based on data from one or more first sensors of the primary computing device following the placement of the primary computing device on the physical surface;
   communicating the user selected reference point by the primary computing device to a communicatively coupled secondary computing device associated with a second user as a physical frame of reference relative to which the second computing device can determine a proximity;
   receiving, from the secondary computing device, a determination of the proximity relative to the user selected reference point on the physical surface in the physical frame of reference based on data from one or more second sensors of the secondary computing device;
   coordinating rendering of an interactive activity by the primary computing device on the physical surface for the first user and the second user utilizing the user selected reference point as the physical frame of reference; and
   rendering a first user perspective image of the interactive activity on the physical surface relative to the user selected reference point for the first user by the primary computing device, the first user perspective image different than a second user perspective image of the second user associated with the secondary computing device of the interactive activity on the physical surface relative to the user selected reference point for the first user,
   wherein the rendering of the interactive activity on the physical surface is a projection of different portions of the interactive activity to project an optimal field of view to each of the users and is coordinated by the primary computing device, via the second computing device, and which enables users to view private information overlaid on top of shared information associated with the interactive activity.

2. The method of claim 1, wherein the primary computing device comprises a mobile computing device, and wherein the secondary computing device comprises a mobile computing device different from the primary computing device, one or more head mounted display (HMD) devices, one or more Liquid Crystal Display (LCD) devices or one or more projection devices.

3. The method of claim 1, wherein the surface comprises at least one of a flat surface, an irregular surface or a three dimensional surface.

4. The method of claim 1 wherein the user selected reference point is a physical object other than one of the computing devices coordinating rendering the interactive activity.

5. The method of claim 1 comprising sensing user gestures on or near the physical surface on which the interactive game is rendered, wherein the user gestures are sensed via one or more sensors in the primary computing device and the secondary computing device.

6. The method of claim 5 comprising communicating the user gestures to the primary computing device and the secondary computing device.

7. The method of claim 6 comprising displaying a result of an action associated with the user gestures on the primary computing device and the secondary computing device.

8. The method of claim 1 wherein, the first user perspective image including private information for the first user.

9. The method according to claim 1, further comprising rendering the second user perspective image of the interactive activity on the physical surface relative to the user selected reference point for the second user via the secondary computing device.

10. The method according to claim 1, wherein the rendering of the interactive activity on the physical surface is a projection from the primary computing device.

11. The method according to claim 1, wherein the projecting includes a tiled display surface of the interactive activity on the physical surface to the first and second users.

12. The method according to claim 11, wherein the tiled display surface of the interactive activity is generated by projecting the interactive activity onto the physical surface using the primary and secondary computing devices.

13. The method according to claim 12, further comprising detecting an orientation of the primary and secondary computing devices to generate the tiled display surface of the interactive activity for the first and second users.

14. The method according to claim 5, wherein the sensing of the user gestures comprises detecting at least one of an audio input, a vibration input and a visual input associated with the user gestures on the physical surface on which the interactive activity is rendered.

15. The method according to claim 14, wherein the audio input, the vibration input and the visual input is detected by one or more of a microphone, a camera and one or more sensors in the primary computing device or one or more secondary computing devices.

16. A system for coordinating interaction between computing devices for users participating in an interactive activity comprising:
   a primary computing device associated with a first user;
   a secondary computing device associated with a second user, the secondary computing device being communicatively coupled to the primary computing device;
   the primary computing device associated with the first user having one or more user input elements including one or more first sensors and operable to detect a user selected reference point on a physical surface;
   the primary computing device having the one or more first sensors operable to identify the user selected reference point on the physical surface device, following the primary computing device being placed on the physical surface, based on data received from the one or more first sensors and operable to communicate the user selected reference point to the communicatively coupled secondary computing device associated with the second user as a physical frame of reference relative to which the second computing device can determine a proximity;

the secondary computing device having one or more second sensors and operable to determine the proximity relative to the user selected reference point on the physical surface in the physical frame of reference based on data received from the one or more second sensors;

the primary computing device and the secondary computing device operable to coordinate rendering of an interactive activity on the physical surface for the first user and the second user utilizing the user selected reference point as the physical frame of reference;

the primary computing device including a first projector and operable to render via the first projector a first user perspective image of the interactive activity on the physical surface relative to the user selected reference point for the first user; and the secondary computing device including a second projector and operable to render via the second projector a second user perspective image of the interactive activity on the physical surface relative to the user selected reference point for the second user, wherein the rendering of the interactive activity on the physical surface is a projection of different portions of the interactive activity to project a tiled display surface in the field of view oriented to each of the users, which is coordinated by the primary computing device and which enables the first and second users to view user-specific information overlaid on top of the interactive activity.

17. One or more processor readable non-volatile storage devices having instructions encoded thereon for causing one or more processors to execute a method for coordinating interaction between computing devices for users participating in an interactive activity, the method comprising:

detecting user placement of a primary computing device associated with a first user on a physical surface, the user placement indicating a user selected reference point on the physical surface;

identifying the user selected reference point on the physical surface based on data from one or more first sensors of the primary computing device;

communicating the user selected reference point by the primary computing device to a communicatively coupled secondary computing device associated with a second user as a physical frame of reference relative to which the second computing device can determine a proximity;

receiving, from the secondary computing device, a determination of the proximity relative to the user selected reference point on the physical surface in the physical frame of reference based on data from one or more second sensors of the secondary computing device;

coordinating rendering of an interactive activity by the primary computing device on the physical surface for the first user and the second user utilizing the user selected reference point as the physical frame of reference; and rendering a first user perspective image of the interactive activity on the physical surface relative to the user selected reference point for the first user by the primary computing device, the first user perspective image different than a second user perspective image of the second user associated with the secondary computing device of the interactive activity on the physical surface relative to the user selected reference point for the first user, and wherein the user selected reference point on the physical surface is a position of the primary computing device on the physical surface, wherein the rendering of the interactive activity on the physical surface is a projection of different portions of the interactive activity to project a tiled display surface of the interactive game, in a field of view oriented to each of the users, which is coordinated by the primary computing device and which enables the first and second users to view user-specific information overlaid on top of the interactive activity.

18. The one or more processor readable non-volatile storage devices according to claim 17, further comprising rendering the second user perspective image of the interactive activity on the physical surface relative to the user selected reference point for the second user via the secondary computing device.

19. The method according to claim 17, wherein the rendering of the interactive activity on the physical surface is a projection from the primary computing device.

20. The method according to claim 19, wherein the projecting includes a tiled display surface of the interactive activity on the physical surface to the first and second users.

* * * * *